C. RYSIEK
UTENSIL HOLDER.
APPLICATION FILED MAR. 13, 1920.
1,341,343.
Patented May 25, 1920.
3 SHEETS—SHEET 2.
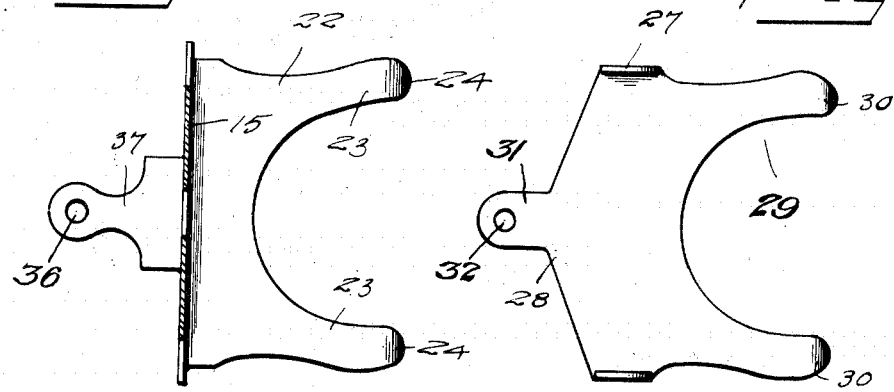
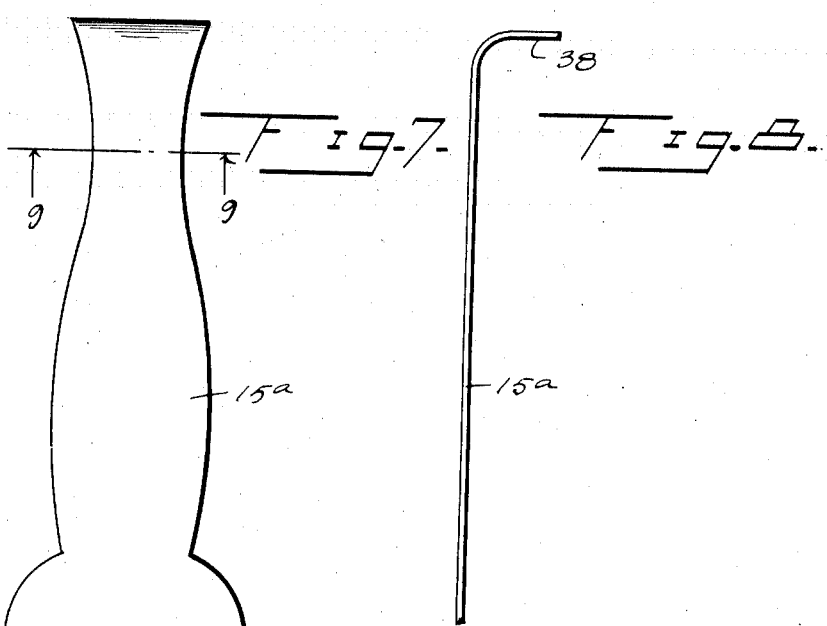
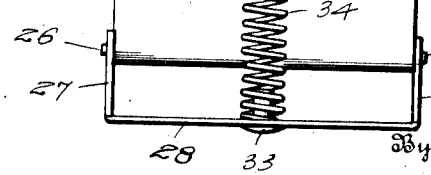
Casimir Rysiek
Inventor
By Thomas R. Harney
Attorney

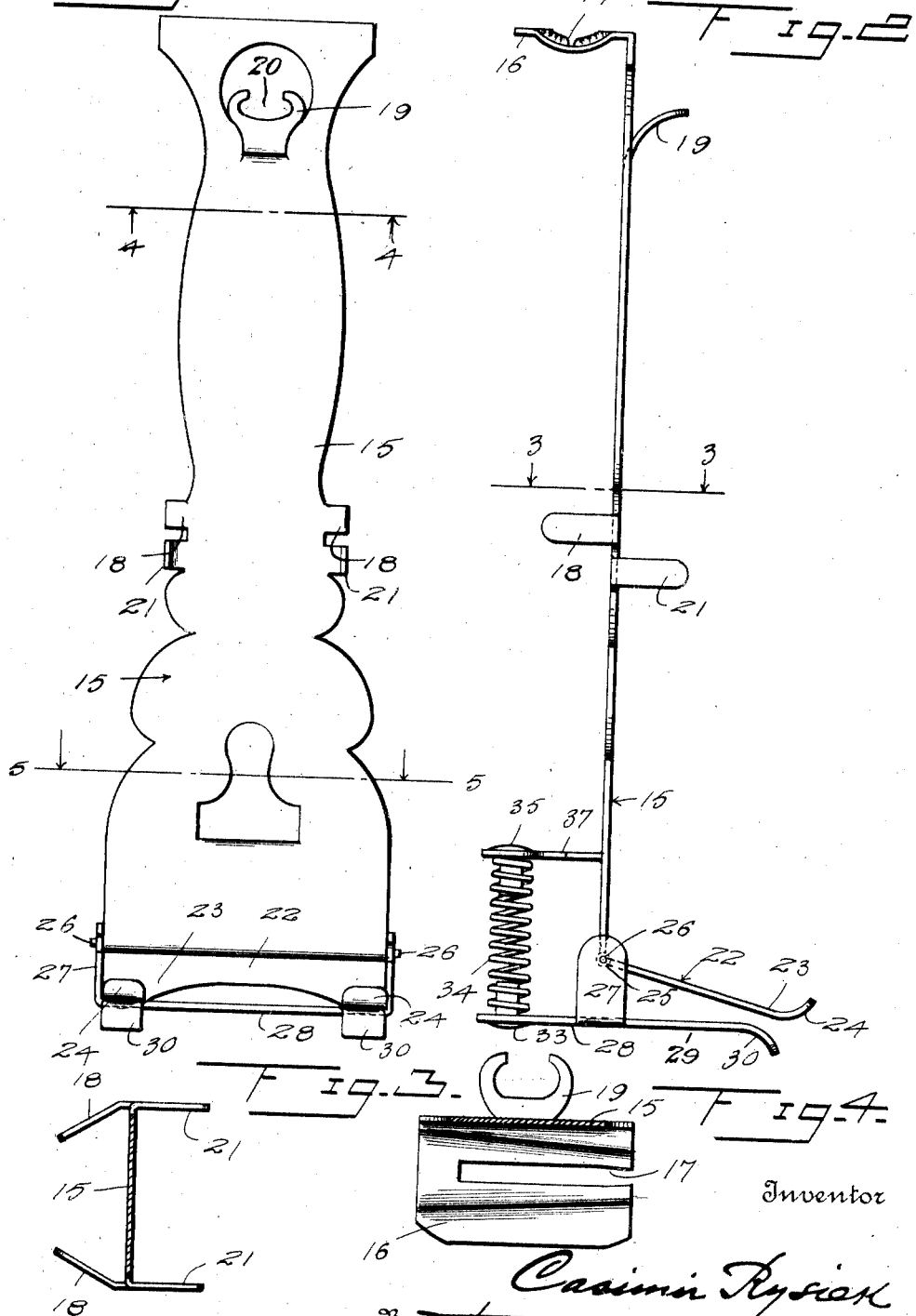

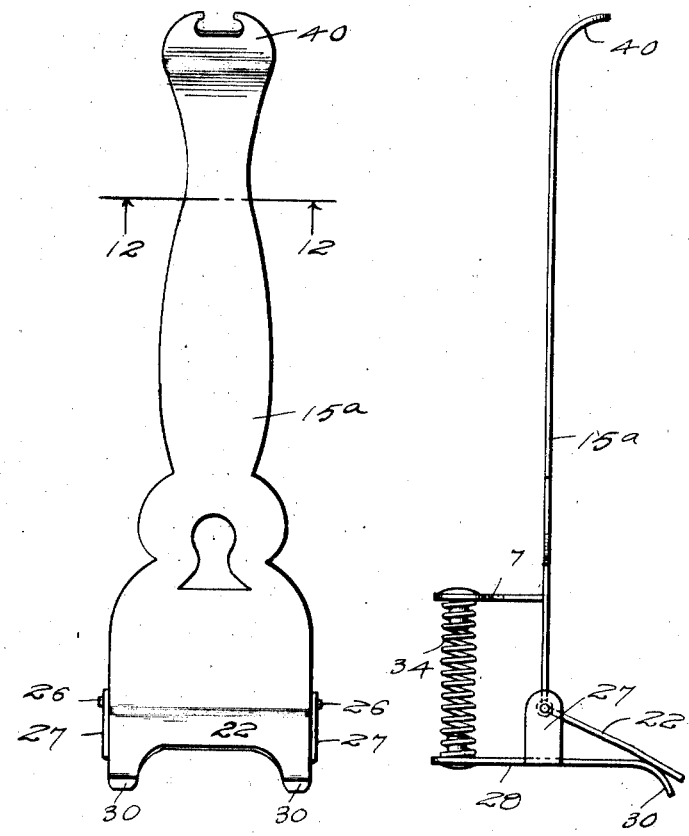

UNITED STATES PATENT OFFICE.

CASIMIR RYSIEK, OF CHICAGO, ILLINOIS, ASSIGNOR OF ONE-HALF TO LUDWIK SIKORSKI, OF CHICAGO, ILLINOIS.

UTENSIL-HOLDER.

1,341,343.   Specification of Letters Patent.   Patented May 25, 1920.

Application filed March 13, 1920. Serial No. 365,535.

*To all whom it may concern:*

Be it known that I, CASIMIR RYSIEK, a citizen of the United States of America, residing at Chicago, in the county of Cook and State of Illinois, have invented certain new and useful Improvements in Utensil-Holders, of which the following is a specification.

My present invention relates generally to article holders and more particularly to utensil holders, my object being the provision of a simple effective and inexpensive holder for supporting utensils in connection with plates, platters and other similar dishes, in the interests of cleanliness and sanitation to obviate careless handling of spoons, knives, ladles and the like.

In its specific construction my invention is susceptible of variation to some extent dependent upon the particular utensils to be held, although it essentially includes in each instance an upright holder having utensil supporting means and a lower plate, platter or dish engaging clamp which will effectively support the upright in operative position.

Thus I have shown in the accompanying drawings slightly modified forms varied in accordance with the utensils to be held, and in these drawings which form a part of this specification, Figure 1 is a front elevation of a holder designed for supporting a carving knife and fork in connection with serving platters, Fig. 2 is a side elevation thereof, Figs. 3, 4 and 5 are horizontal sections taken respectively on line 3—3 of Fig. 2 and lines 4—4 and 5—5 of Fig. 1, Fig. 6 is a top plan view of the clamping member removed, Figs. 7, 8 and 9 are respectively a rear elevation, partial side view and horizontal section through a modified form of holder designed for supporting a tablespoon, Fig. 9 being taken on line 9—9 of Fig. 7, Figs. 10, 11 and 12 are respectively a front elevation, side view, and horizontal section through another modified form designed for the support of a teaspoon, Fig. 12 being taken on line 12—12 of Fig. 10.

Referring now to these figures and particularly to Figs. 1 to 6 inclusive my invention proposes a utensil holder including a utensil supporting upright 15, which may be of plain outline or of a graceful design, and which may be formed of different materials, depending upon the particular use to which it is to be put, this upright being flat and having an upper angularly bent end 16 formed to present a concave upper surface and provided with a transversely elongated opening 17 extending through one side, to receive the blade of a knife whose handle is uppermost and is seated at one end in the concavity of the angular extension. This extension 16 projects rearwardly from the upper end of the upright and its slot 17 is located for the most part in a vertical plane between rearwardly projecting lugs 18 extending from the sides of the upright, between which the lower portion of depending blades is confined against lateral swinging movement.

Adjacent to its upper end the upright 15 has an integral portion 19 struck-up therethrough and curved forwardly, this struck-up portion 19 being provided with a recess 20 in its end for the reception of a fork, with the handle thereof above portion 19 and with the tines depending between forwardly bent side lugs 21 of the upright so as to prevent lateral swinging movement of the utensil.

At its lower end the upright 15 has a forwardly bent angular extension 22, which is preferably bifurcated to form forwardly projecting laterally spaced clamping feet 23 terminating in upwardly curved extremities 24, as seen particularly by a comparison of Fig. 2 and 5, and the upright is further provided at its lower end, adjoining its extension 22, with laterally projecting extensions 25 adapted to enter and movably occupy openings 26 in the upturned side ears 27 of a clamping plate 28 whose forward portion is bifurcated to form laterally spaced clamping feet 29 opposing the clamping feet 23 of the upright as seen by a comparison of Figs. 1, 5 and 6. These feet 29 terminate in downturned extremities 30.

The rear portion of the clamping plate 28 is in the form of a reduced extension 31 having an aperture 32 through which the lower end of a spring guide post 33 is riveted or otherwise rigidly secured. This guide post receives therearound the lower end of a compression coil spring 34 whose upper end similarly extends around a guide post 35 the upper end of which is riveted or otherwise rigidly secured through an opening 36 of an extension 37 projecting rearwardly from the upright 15 at a point above its lower end and opposing the rear portion of the clamping member 28 in vertically spaced relation.

The extension 37 is formed by an integral struck-up portion of the holder 15, and the spring 34 compressed between the same and the rear portion of the clamping plate or member 28 thus tends to press the clamping feet 23 and 29 toward one another and into clamping relation at all times.

It is thus obvious that by simply shifting the edge of a platter and the like between the clamping feet 29, the upright will be effectively held in operative position, for which purpose its upper portion may be turned into approximately a vertical plane, and more or less bent dependent upon the particular incline of the surrounding edge of the plate in connection with which it is engaged for the purpose of holding the knife and fork.

In the form of the invention shown in Figs. 7, 8 and 9, the structure of the parts in so far as the clamping support of the upright 15ᵃ of these figures is concerned, is a duplicate of that structure previously described. In Figs. 7 to 9 inclusive the construction of the holding upright 15ᵃ is somewhat varied however for the purpose of supporting a tablespoon. To this end the upper portion of the upright 15ᵃ is curved laterally as at 38, this laterally curved upper extremity having a tablespoon receiving recess 39 so that a tablespoon disposed therein with its handle uppermost, will have its lower relatively heavy bowl portion depending at one side of the upright.

A somewhat similar construction is carried out in Figs. 10, 11 and 12 where the upright 15ᵃ, having a lower clamp like Figs. 1 to 6 inclusive, has its upper end curved as seen at 40, this curved portion having a teaspoon receiving recess 41 wherein a teaspoon may be disposed with its handle uppermost and its bowl depending in order to obviate lateral swing.

It is obvious that in each form of the invention the fact that the upright is flat throughout renders it an easy matter to bend the same into vertical position with the clamp in engagement with the inclined edge or rim of a plate, platter, dish and the like and it is further obvious that by virtue of the fact that the utensils are held with their handles projecting upwardly and these handle portions only of the implements are exposed to be grasped above the holder, careless handling and grasping of the lower blades, tines or bowl portions of the implements is avoided.

I claim:

1. A utensil holder including an upright having utensil holding means at its upper portion and provided with a lower angularly bent end and an extension above said lower end bent in a relatively opposite direction, a clamping member with which the lower portion of the upright is pivotally connected, having a forward portion underlying the angular lower end of the upright and a rear portion underlying the extension of the upright, and a spring compressed between the said rear portion of the clamping plate and the said extension of the upright, said forward portion of said clamping plate and said angular lower end of the upright being bifurcated to form vertically opposed and laterally spaced clamping feet, as described.

2. A utensil holder including an upright having a flat body provided with utensil holding means at its upper portion and having a lower angular end, said upright being provided with lateral projections adjacent to its lower angular end and with an extension above said lower end projecting in a relatively opposite direction thereto, a lower flat clamping plate having upstanding side ears intermediate its ends provided with apertures to receive the lower lateral extensions of the upright, the said clamping plate having a forward portion underlying and opposing the angular end of the upright and having a rear portion opposing the extension of the upright in vertically spaced relation, and a spring compressed between the rear portion of the clamping plate and the said extension of the upright, said angular lower end of the upright and said forward portion of the clamping plate having laterally spaced vertically opposing clamping feet respectively provided with upturned and downturned extremities as described.

In testimony whereof I have affixed my signature.

CASIMIR RYSIEK.